United States Patent [19]
Kanki et al.

[11] Patent Number: 6,040,356
[45] Date of Patent: Mar. 21, 2000

[54] DURABLE GRAVURE INK AND USES OF THE SAME

[75] Inventors: Masahiro Kanki; Mutsuhiro Kawano; Takashi Matano, all of Shinjuku-Ku, Japan

[73] Assignee: Dai Nippon Printing Co., Ltd., Japan

[21] Appl. No.: 09/051,886

[22] PCT Filed: Aug. 28, 1997

[86] PCT No.: PCT/JP97/02999

§ 371 Date: May 11, 1998

§ 102(e) Date: May 11, 1998

[87] PCT Pub. No.: WO98/08905

PCT Pub. Date: Mar. 5, 1998

[30] Foreign Application Priority Data

Aug. 28, 1996 [JP] Japan ................................. 8-243979
Dec. 3, 1997 [JP] Japan ................................. 9-347309

[51] Int. Cl.[7] ................... C08K 5/3415; C08K 5/3432; C08L 27/06; C08L 27/12; C08L 75/08
[52] U.S. Cl. .......................... 523/160; 524/89; 524/94; 524/485; 524/486
[58] Field of Search ................... 523/160, 161; 106/31.6, 31.77, 31.78, 31.81; 524/89, 94, 485, 486

[56] References Cited

U.S. PATENT DOCUMENTS

| | | | |
|---|---|---|---|
| 4,196,033 | 4/1980 | Arai et al. ................................. | 156/196 |
| 4,213,926 | 7/1980 | Toyoda et al. ............................ | 264/74 |
| 4,767,465 | 8/1988 | Nakamura et al. ....................... | 106/413 |
| 4,869,532 | 9/1989 | Abe et al. ................................. | 283/88 |
| 5,246,785 | 9/1993 | Matano et al. ......................... | 428/542.2 |
| 5,489,355 | 2/1996 | Shimizu et al. .......................... | 156/230 |
| 5,585,189 | 12/1996 | Inoue et al. .............................. | 428/461 |
| 5,607,808 | 3/1997 | Nishizawa et al. ...................... | 430/137 |
| 5,656,359 | 8/1997 | Hirota et al. ............................. | 428/195 |
| 5,824,415 | 10/1998 | Kanki et al. .......................... | 428/411.1 |

FOREIGN PATENT DOCUMENTS

| | | |
|---|---|---|
| 4-135826 | 5/1992 | Japan . |
| 8-217986 | 8/1996 | Japan . |

OTHER PUBLICATIONS

Morrison, Robert Thornton and Boyd, Robert Neilson; Organic Chemistry, Allyn and Bacon, Inc. Boston (p. 982), 1987.

The Japan Society of Color Material, "Color Material Handbook" (in Japanese), 1st Edition, Nov. 1989 by A. Shoten, pp. 1153–1157 & 318–343.

Technical Association of Graphic Arts of Japan, "Printing Engineering Handbook" (in Japanese), 1st Edition, May 1983 by G. Shuppan, pp. 901–915.

Japan Pigment Technology Association, "Revised New Edition Pigment Handbook" (in Japanese), Mar. 1989 by S. Shinkoshi, pp. 468–505.

The Society of Polymer Science, Japan, "Polymer Engineering Lectures 10 Colorant Engineering Paint, Pigment and Printing Ink" (in Japanese), Reprint Edition, Aug. 1967 by C. Shokan, p. 11.

*Primary Examiner*—Vasu Jagannathan
*Assistant Examiner*—Callie E. Shosho
*Attorney, Agent, or Firm*—Parkhurst & Wendel, LLP

[57] ABSTRACT

This invention relates to a durable gravure ink composed of a pigment with high weather resistance, a pigment with high alkali resistance, and a binder with high weather resistance and high alkali resistance, and a technique for producing a decorative material using this ink. According to this invention, a decorative material having a pattern layer excellent in both of weather resistance and alkali resistance is provided.

5 Claims, 5 Drawing Sheets

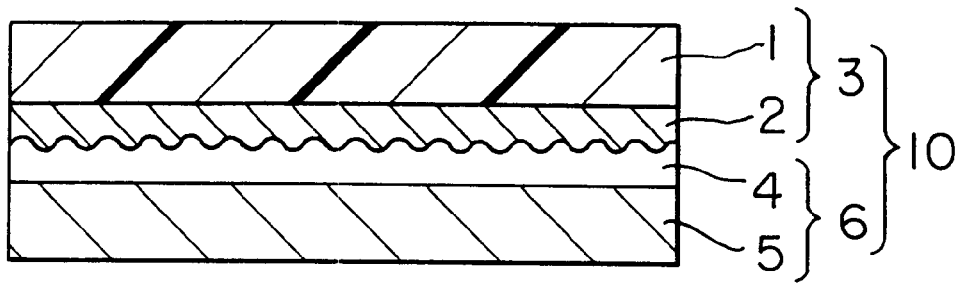
F I G. 1
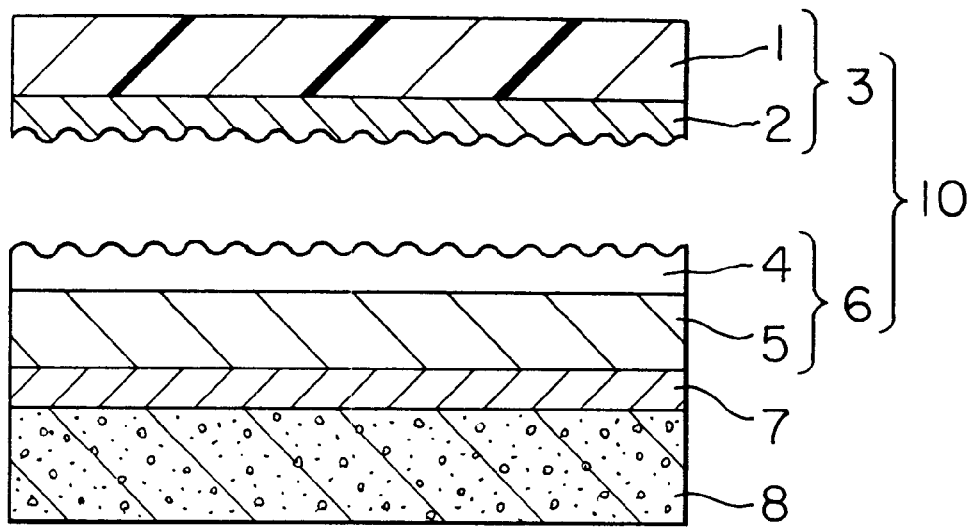
F I G. 2

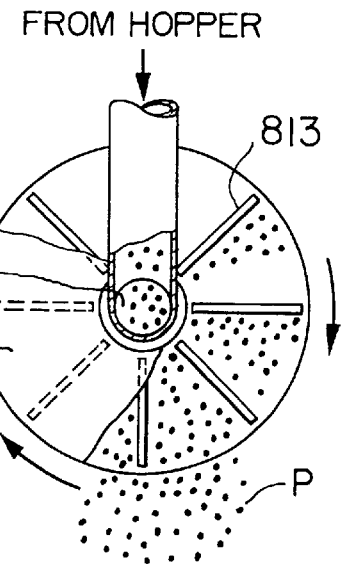
F I G. 4
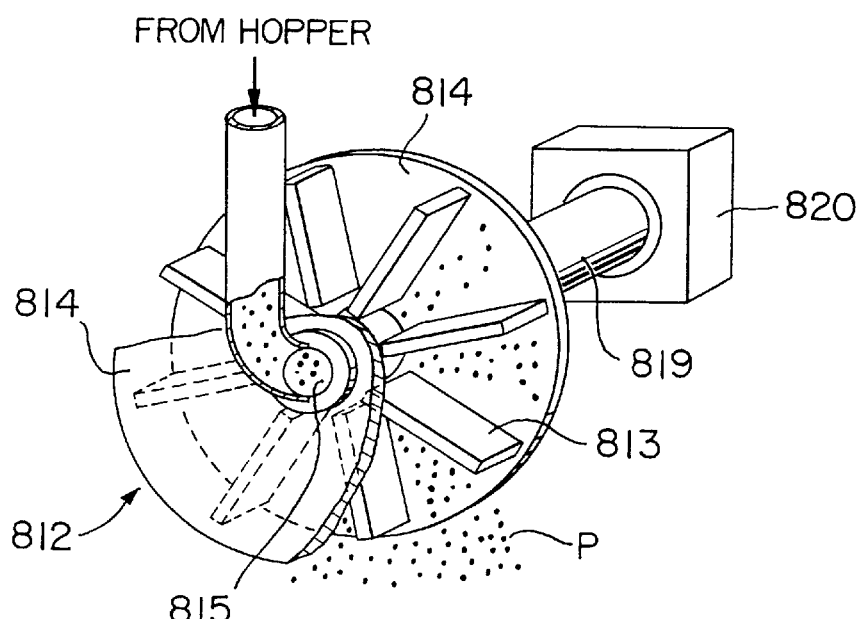
F I G. 5
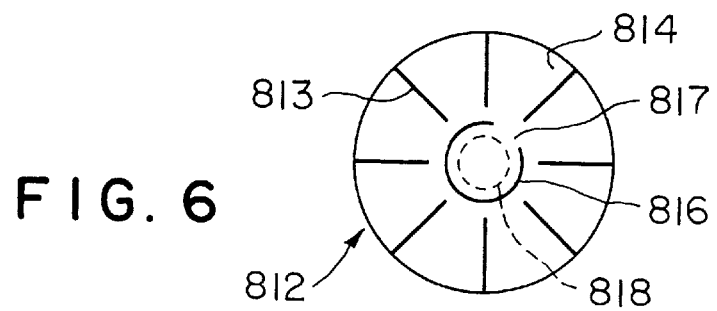
F I G. 6

DURABLE GRAVURE INK AND USES OF THE SAME

TECHNICAL FIELD

This invention relates to a printing ink for a decorative material such as a floor surface or a wall surface, and a decorative material using the printing ink. More specifically, the invention relates to a durable gravure ink excellent in both weather resistance, i.e., resistance to wind, rain and direct sunlight when used in an exterior cladding, and alkali resistance, i.e., applicability to a surface of mortar or the like which exudes an alkaline component (hereinafter, the properties such as weather resistance and alkali resistance will be collectively referred to as durability), and a decorative material and a transfer sheet using the gravure ink.

BACKGROUND ART

A decorative material prepared by gravure printing has so far been given a decoration comprising a gravure ink. The gravure ink has been composed of color pigments, including a red pigment of the monoazo type, a yellow pigment of the bisazo type, copper phthalocyanine blue, and carbon black; and a binder for the pigments, such as a rosin derivative or a linear polyester.

Except for copper phthalocyanine blue and carbon black, however, these materials were poor in light fastness (especially weather resistance). When exposed to sunlight for a long time, therefore, an ordinary ink for architectural materials, used as a source of a mixture of primary colors, yellow, red, blue and black, undergoes fading of the red and yellow in the ink, thereby discoloring the inked decorative material into a blue or black tone. When such an ordinary ink for architectural materials, as a source of a mixture of primary colors, yellow, red, blue and black, is applied to a surface of mortar or the like from which an alkaline component seeps, the red and yellow fade, producing a decoration with a bluish black tone. Besides, the binder is attacked, whereby the decoration may fall off.

It was easy to select pigments, thereby improving weather resistance alone, or alkali resistance alone. However, it was difficult to find a red pigment and a yellow pigment that possess both of these properties. For example, a red pigment comprising quinacridone and a yellow pigment comprising isoindolinone were very high in weather resistance, but insufficient in alkali resistance. Red and yellow pigments of the polyazo type were excellent in alkali resistance, but insufficient in weather resistance.

To prevent deterioration of the decoration, it has been practiced to incorporate an ultraviolet absorber into its topcoat layer and apply several coatings of an acrylic paint having light fastness, or to provide the mortar surface with a primer layer having alkali resistance in order to prevent the seepage of the alkaline component.

These methods, however, require a topcoat or a primer which are expensive, special materials. They also pose the problem of increasing the number of steps and the expenses, because surplus layer formation is involved. Furthermore, even when the topcoat layer is light fast, the pigments as colorants, if poor in light fastness and alkali resistance, fade and discolor the entire decoration in a bluish black look.

By using copper phthalocyanine blue as a blue pigment and carbon black as a black pigment, it is possible to make an ink satisfactory in both weather resistance and alkali resistance. However, there may be a desire to employ other kinds of pigments because of the price, tone, and required properties before than weather resistance and alkali resistance. This desire cannot be satisfied by the use of copper phthalocyanine blue and carbon black. For blue and black as well, there has been need to increase the variety of feasible pigments.

DISCLOSURE OF THE INVENTION

An object of the present invention is to provide a gravure ink and a decorative material for exterior cladding and application to mortar, which simplify the several coating steps required earlier technologies and have both weather resistance and alkali resistance in their pigments and binder.

A first aspect of the present invention for attaining this object is a durable gravure ink composed of a pigment with high weather resistance, a pigment with high alkali resistance, and a binder with both of high weather resistance and high alkali resistance.

A preferred embodiment of the present invention is the above durable gravure ink of a red color in which the pigment with high weather resistance is at least one pigment selected from among quinacridone, perylene and anthracene red pigments, and the pigment with high alkali resistance is selected from polyazo red pigments.

In another preferred embodiment, the pigment with high weather resistance is an isoindolinone yellow pigment, and the pigment with high alkali resistance is a polyazo yellow pigment.

In still another embodiment, the binder resin with high weather resistance and high alkali resistance comprises a vinyl chloride-vinyl acetate copolymer and an epoxy compound based stabilizer.

A second aspect of the present invention is a decorative material having a decorative layer provided on a base, the decorative layer being formed from the above-mentioned durable gravure ink.

A third aspect of the present invention is a transfer sheet having a pattern transfer layer on a surface of a base sheet having release properties, the pattern transfer layer being formed from a durable gravure ink composed of a pigment with high weather resistance, a pigment with high alkali resistance, and a binder with both of high weather resistance and high alkali resistance.

BRIEF DESCRIPTION OF THE DRAWINGS

FIG. 1 is a sectional view of a transfer sheet using a gravure ink of the present invention;

FIG. 2 is a sectional view showing a state in which a pattern transfer layer of the transfer sheet of the present invention is provided on the surface of mortar;

FIGS. 4, 5, 6, 7A, 7B, 8A, 8B and 9 are views of devices that can be used in producing the decorative material of the present invention.

BEST MODE FOR CARRYING OUT THE INVENTION

Figure 3A:
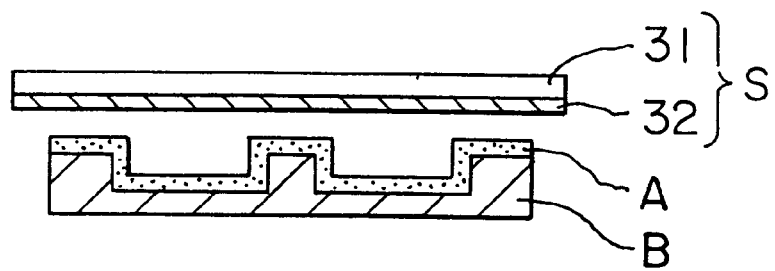
FIGS. 3A, 3B and 3C are sectional views of steps showing a method for producing a decorative material by the use of the transfer sheet of the present invention.

The gravure ink of the present invention is composed of a pigment with high weather resistance, a pigment with high alkali resistance, and a binder.

In producing a color ink excellent in both of weather resistance and alkali resistance, the present invention forms one color from a mixture of two types of pigments in which the first type of pigment fulfills either weather resistance or alkali resistance, while the second type of pigment fulfills the other resistance.

In the present invention, the "excellent or high" weather resistance of the pigment or the binder is defined as follows: The ink having the pigment dispersed in an acrylic resin binder is spread on a polyvinyl chloride sheet. The so inked sheet is exposed for 1,000 hours under the conditions, a black panel temperature of 63° C. and a water spray time of 12 minutes in a period of 60 minutes, by means of a carbon arc type sunshine weatherometer. Then, the tested sample is measured by a 5-grade gray scale for discoloration and fading (JIS-L-0804). The color difference between the sample before exposure and the sample after exposure is determined. A color difference of 4 or more represents the "excellent or high" weather resistance.

The "excellent or high" alkali resistance is defined as follows: The ink is printed on a polyvinyl chloride sheet, and the printed sheet is immersed for 720 hours (30 days) in a 10% aqueous solution of sodium hydroxide at 25° C. Then, the sample is dried and evaluated by the same gray scale as described above. The color difference between the sample before immersion and the sample after immersion is determined. A color difference of 4 or more represents the "excellent or high" alkali resistance of the pigment.

The binder without the pigment is subjected to the same test. The tested sample is evaluated as excellent in weather resistance or alkali resistance, if it shows a change in color, defined as a color difference $\Delta E$ of 1.0 or less when measured with the CIE LAB color space, or it is free from peeling or cracking of the binder.

Examples of the materials constituting the gravure ink of the present invention are as follows: Examples of pigments high in weather resistance but insufficient in alkali resistance are quinacridone, perylene and anthracene series red pigments, isoindolinone series yellow pigments, blue pigments such as Prussian blue and fast sky blue, and black pigments comprising mixtures of these yellow, red and blue pigments. Examples of pigments high in alkali resistance but insufficient in weather resistance are polyazo yellow pigments or polyazo red pigments which are the condensates of azo pigments, blue pigments such as indanthrene blue, and black pigments such as aniline black. The blue and black pigments may also be mixtures comprising pigments high in weather resistance alone and pigments high in alkali resistance alone. However, pigments excellent in both of weather resistance and alkali resistance are available for blue and black, so that their use is preferred. Examples of such pigments are chlorinated copper phthalocyanine blue or green pigments, and carbon black as a black pigment. Other pigments with both high weather resistance and high alkali resistance include, for example, inorganic pigments such as titanium oxide and iron oxide, and extender pigments such as calcium carbonate, barium sulfate and silica. Pigments selected from these pigments constitute a gravure ink having the desired tone.

The binder constituting the gravure ink of the present invention can preferably be selected from vinyl chloride-vinyl acetate copolymers (including those copolymerized with maleic anhydride or ethylene glycol), cyclized rubbers, polyurethanes comprising acrylic polyols or polyether polyols and polyisocyanates, nitrocellulose, epoxy resins, polyvinyl fluoride, and polyvinylidene fluoride. These binders may be used alone or in combination of two or more. The vinyl chloride-vinyl acetate copolymer, in particular, may contain an epoxy compound-derived stabilizer.

If desired, a plasticizer based on consideration for alkali resistance is selected from hydrocarbons, halogenated hydrocarbons, polyethers, polyglycols and sulfonamides, and may be used.

In the gravure ink, it is preferred to add a stabilizer for preventing the decomposition or discoloration of the pigment and binder. For example, benzophenone derived, benzotriazole derived, cyanoacrylate derived, benzoate derived, formamidine derived, or hindered amine derived compounds, and aminobenzoic acid and its esters may be added as ultraviolet absorbers or antioxidants.

The binder and stabilizer are dissolved in a solvent suitable for printing to prepare a vehicle. The solvent can be selected from ordinary ones usable for gravure printing. Its examples are hydrocarbons such as toluene and xylene, esters such as ethyl acetate, butyl acetate, ethylene glycol and monomethyl ether acetate, ketones such as methyl ethyl ketone, methyl isobutyl ketone, isophorone and cyclohexanone, alcohols such as isopropyl alcohol, ethanol and butyl alcohol, and ethers such as ethylene glycol monoethyl ether. From these solvents, two or more are selected and mixed, where necessary, in view of the solubility of the binder and the drying rate adapted to printing, thereby preparing a vehicle.

The thus constituted gravure ink the present invention makes it possible to provide a decorative material having both of high weather resistance and high alkali resistance.

The material to be printed for decorative material formation, to which the durable ink of the present invention can be applied, comes in various forms such as a sheet and a plate. The material to be printed can be determined according to the type of the binder, but preferably, should be capable of sufficiently withstanding use as an ordinary decorative material.

Examples of the sheet-shaped material are tissue paper comprising paper or a fibrous sheet similar to paper, kraft paper, titanium paper, linter paper, backed paper for vinyl wall paper, coat paper, art paper, paper board, gypsum board, parchment paper, paper using natural pulp such as Japanese paper, and sheets comprising inorganic fibers such as glass fiber, asbestos fiber, potassium titanate fiber, alumina fiber, silica fiber and carbon fiber, and fibers of polyester, polyamide, the acetalization product of polyvinyl alcohol (trade name: vinylon), and organic polymeric compounds of acrylonitrile, etc.

Examples of a plastic film as the material to be printed are films of polyesters such as polyethylene terephthalate and polybutylene terephathalate, polyamides such as nylon 6 and nylon 66, rigid or soft poly(vinyl chloride), vinyl copolymers such as ethylene-vinyl acetate copolymer saponification product, ethylene-vinyl acetate copolymer, ethylene-acrylic acid copolymer and ethylene-acrylic ester copolymer, acrylic resins such as polymethyl methacrylate, polycarbonates, polyolefins such as polyethylene and polypropylene, and ionomers. Any of these films may be printed, or the printed film and a transparent film may be laminated together.

The plate-shaped material to be printed includes, for example, wooden plates such as veneer, plywood, particle board, and medium density fiber board (MDF), gypsum plates such as gypsum board and gypsum slag board, calcium silicate plate, asbestos slate plate, concrete plate, lightweight foamed concrete (ALC) plate, glass fiber reinforced concrete (GRC) plate, ceramics plate, steel plate, resin plate, fiber reinforced plastic (FRP) plate, and a composite plate comprising two or more of these plates laminated together.

Any of the above-described various decorative sheets or decorative plates can be laminated on a base material which will serve as a building material. The laminate can be used as a floor covering or a wall surface material. Especially when the base material is an alkaline one such as lightweight foamed concrete, the durability that the decorative material of the present invention possesses takes effect.

As the base material, there can be exemplified plates enumerated as the plate-shaped materials to be printed.

To form a pattern layer on the material to be printed by the use of the durable ink of the present invention, gravure printing, silk screen printing, flexography using a letterpress, gravure-offset printing, or transfer printing can be used.

The transfer sheet of the present invention has a pattern transfer layer on the surface of a base sheet having release properties, the pattern transfer layer consisting at least of a pattern layer printed using the durable ink of the present invention. If desired, the transfer layer may further have a strippable primer layer and an adhesive layer.

The base sheet having release properties that constitutes the transfer sheet may be a stretched or unstretched film of polyester such as polyethylene terephthalate or polybutylene terephthalate, a polyolefin resin such as polyethylene, polypropylene, polymethylpentene or an olefin type thermoplastic elastomer, a polyamide such as nylon 6 or nylon 66, or a vinyl resin such as polyvinyl chloride, paper such as parchment paper, kraft paper or coat paper, or a laminated film comprising these materials.

To impart release properties, a release layer is provided between the transfer layer and the base material, whereby the release properties and transfer properties of the transfer sheet can be stabilized.

The release layer is to remain on the base sheet side after the pattern layer is transferred. This release layer is formed by coating polyolefin resin, fluororesin, melamine resin, wax, or silicone resin alone or as a mixture with other binder. To the release layer, a delusterant from fine particles may be added. Alternatively, the release layer may be embossed with the desired irregular pattern to form an irregular pattern on the surface of the transferred image.

A strippable primer layer may be provided between the base sheet having release properties and the pattern layer. The strippable primer layer acts to adjust the strippability between the pattern transfer layer and the base sheet so as not to become nonuniform depending on color or pattern. By so doing, the primer layer has the effect of enhancing the surface properties, scratch resistance, chemical resistance and stain resistance of the transferred pattern layer. This effect is marked, particularly when an ionizing radiation curable resin is used.

Stripping in this case takes place at the interface between the strippable primer layer and the release layer (or the base film).

A preferred example of the ionizing radiation curable resin is a composition which comprises a suitable mixture of a prepolymer, a polymer and/or a monomer each having a polymerizable unsaturated bond or a cationic polymerizable functional group in the molecule and which can be cured with ionizing radiation.

The ionizing radiation herein refers to an electromagnetic wave or a ray of charged particles which has energy quantum capable of polymerizing or crosslinking molecules. Usually, ultraviolet radiation or an electron beam is used as the ionizing radiation.

Examples of the ionizing radiation curable resin are a monomer, a prepolymer and a polymer each having a radical polymerizable unsaturated group such as (meth)acryloyl group or (meth)acryloyloxy group, a cationic polymerizable functional group such as epoxy group, or two or more thiol groups. These components are used alone or as a mixture of several types.

Examples of the prepolymer having a radial polymerizable unsaturated compound are polyester (meth)acrylate, urethane (meth)acrylate, epoxy (meth)acrylate, melamine (meth)acrylate, and triazine (meth)acrylate. The molecular weight of this prepolymer is usually 250 to 10,000. The polymer having a radial polymerizable unsaturated compound is any of these enumerated polymers which has a degree of polymerization of 10,000 or more.

As the prepolymer having a cationic polymerizable functional group, there can be exemplified epoxy resins such as bisphenolic epoxy resins and novolak type epoxy resins, resins derived from vinyl ethers such as aliphatic vinyl ether and aromatic vinyl ether.

As the monofunctional monomer having a radical polymerizable unsaturated group, there can be exemplified monomeric (meth)acrylate compounds, such as methyl (meth)acrylate, 2-ethylhexyl (meth)acrylate, and phenoxyethyl (meth)acrylate.

Examples of the polyfunctional monomer having a radical polymerizable unsaturated group are diethylene glycol (meth)acrylate, propylene diglycol (meth)acrylate, trimethylolpropane (meth)acrylate, trimethylolpropane ethylene oxide tri(meth)acrylate, dipentaerythritol penta(meth) acrylate, and dipentaerythritol hexa(meth)acrylate.

As the monomer having a cationic polymerizable functional group, the monomer for the above prepolymer having a cationic polymerizable functional group can be used. As the monomer having thiol groups, trimethylolpropane trithioglycolate and dipentaerythritol tetrathioglycolate can be exemplified.

When ultraviolet radiation or visible radiation is used for curing, a photopolymerization initiator is preferably added into the ionizing radiation curable resin. The photopolymerization initiator for the resin having a radical polymerizable unsaturated group may be any of acetophenones, benzophenones, thioxanthones, benzoin, or benzoin methyl ether. These substances may be used alone or as a mixture. For the resin having a cationic polymerizable functional group, the photopolymerization initiator may be aromatic diazonium salts, aromatic sulfonium salts, aromatic iodonium salts, metallocene compounds, or benzoin sulfonic esters. These substances may be used alone or as a mixture.

The amount of the photopolymerization initiator added is 0.1 to 10 parts by weight per 100 parts by weight of the ionizing radiation curable resin.

A heat sensitive adhesive for the transfer sheet of the present invention is determined by the type of the material to receive the transfer layer. However, it may be an ordinary thermoplastic resin having alkali resistance. Preferred examples are ethylene-vinyl acetate copolymer, ethylene-acrylic acid copolymer, ethylene-acrylic ester copolymer, ionomer, and vinyl chloride-vinyl acetate copolymer.

To provide the pattern transfer layer of the transfer sheet directly on concrete, the surface to receive the transfer layer is coated with an adhesive such as isocyanate, two component curable polyurethane, or acrylic emulsion. After volatile components evaporate, the transfer sheet is laminated in an adherent condition on the concrete. After the adhesive solidifies, the base sheet can be peeled off. The release sheet may be left for protection of the decorative layer during construction work.

For transferring the transfer sheet of the present invention to the base to receive the transfer layer, various transfer methods can be employed. In the case of an alkaline base of the mortar type, cement type or calcium silicate type, however, a transfer method using solid particle impingement pressure is preferred, because such a base is generally porous and rough-surfaced.

This transfer method is a novel method, and it is effective particularly for transfer onto an uneven surface.

Figure 3B:
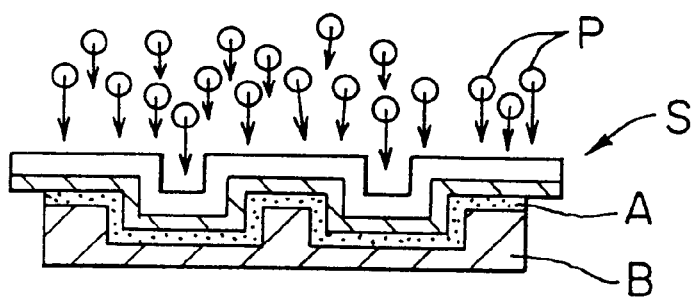
Figure 3C:
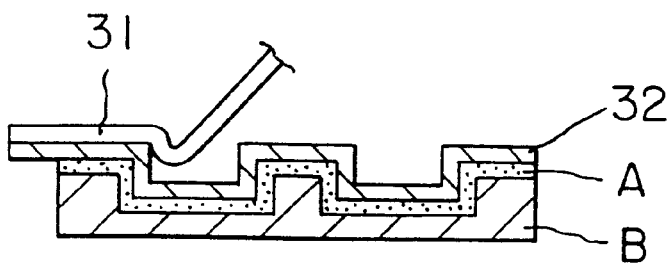

That is, as illustrated in FIG. 3, this method comprises placing the transfer layer 32 side of a transfer film S on the transfer-imposed side B via an adhesive layer A (FIG. 3A), causing solid particles P to impinge from the support film 31 side, thereby to form the transfer layer 32 according to the shape of the surface of the transfer-imposed body under this impinging pressure, and adhere the transfer layer 32 to the surface of the transfer-imposed body (FIG. 3B), and then stripping off the support sheet 31 only (FIG. 3C).

To prevent the solid particles P from scattering in the ambient space, it is preferred to seal the surroundings of a solid particle ejector with partition walls, and apply the above-mentioned transfer pressure in the sealed chamber.

Examples of the solid particles P are nonmetallic inorganic particles as inorganic powder such as glass beads, ceramic beads, calcium carbonate beads, alumina beads, zirconia beads, Alundum beads and corundum beads, metallic particles such as beads of metals, e.g., iron or iron alloys such as carbon steel and stainless steel, aluminum or aluminum alloys such as duralumin, titanium and zinc, and organic particles such as resin beads, e.g., fluororesin beads, nylon beads, silicone resin beads, urethane resin beads, urea resin beads, phenolic resin beads, and crosslinked rubber beads. When liquid water is used as a fluid for accelerating the solid particles, the preferred solid particles are nonmetallic particles that do not corrode or rust with water, such as stainless beads, glass beads, ceramic beads and resin beads. The shape of the solid particles is preferably spherical, but may be ellipsoidal, polyhedral, squamous, irregular or any other shape. The usual particle size of the solid particles is about 10 to 1,000 µm.

The solid particles can concurrently serve as heating means or cooling means. The use of heated solid particles makes it possible to heat activate the adhesive, promote its crosslinking and curing, or enhance the stretchability of the transfer sheet upon heating, while pressing the transfer sheet. In this case, the transfer sheet or the transfer-imposed base may be heated to a certain degree by another heating method before the impingement pressure is applied. Alternatively, for the purpose of promoting cooling after adhesion, solid particles of a lower temperature than the temperature of the adhesive at the time of adhesion may be used as cooling solid particles. The solid particles may also be partly or totally used as heating solid particles or cooling solid particles, or may be used in a combined manner such that cooling solid particles are caused to impinge after impingement of heating solid particles. It is also permissible to sufficiently heat the transfer sheet, the transfer-imposed base or the adhesive, which requires heating, by another heating method, and then apply cooling solid particle thereto, thereby performing the shaping, adhesion and cooling almost simultaneously.

The heating or cooling of the solid particles to be stored in a tank shaped like a hopper may be done by heating means or cooling means, such as an electric heater, heating steam or refrigerant, provided in the tank or on the external wall of the tank. These means may be provided on the outer wall of a solid particle transport pipe to heat or cool the solid particles via the transport pipe. When a fluid is used to accelerate the solid particles, a cooled or heated fluid may be used to cool or heat the solid particles by heat conduction from the fluid. In this case, the fluid is also caused to impinge on the transfer sheet, whereby the fluid can also be used as heating or cooling means along with the solid particles. If the fluid is a liquid and a tank for storing the solid particles together with the liquid is used, the solid particles and the liquid may be cooled or heated during storage.

To impinge solid particles on the transfer sheet, thereby applying the impinging pressure and pressing the transfer sheet against the transfer-imposed base, the solid particles are ejected from solid particle ejecting means toward the transfer sheet to apply the impinging pressure to the transfer sheet. As the solid particle ejecting means, a particle accelerator is used, such as an ejector using a rotating impeller, or an ejector using a blowing nozzle. The impeller-based ejector accelerates and jets solid particles by the rotation of the impeller. The blowing nozzle-based ejector uses a solid particle accelerating fluid to accelerate and carry solid particles in the high speed stream of the fluid, and jets the solid particles together with the fluid. For the impeller or the blowing nozzle, a technique used in the field of blasting can be applied, such as sand blasting, shot blasting or shot peening. For the impeller, for example, a centrifugal blasting machine is available; for the blowing nozzle, a pressure or suction blasting machine or a wet blasting machine is available. The centrifugal blasting machine accelerates and jets solid particles by the rotating force of an impeller. The pressure blasting machine mixes solid particles with compressed air, and forces them out together with the air. The suction blasting machine sucks solid particles into a negative pressure area generated by a high velocity stream of compressed air, and directs the solid particles outward along with the air. The wet blasting machine mixes solid particles with a liquid, and jets the mixture.

Besides the blowing nozzle and impeller, other methods are usable as the solid particle ejecting means, such as the acceleration of solid particles by a gravitational free fall, and the acceleration of magnetic particles by a magnetic field. The solid particle ejecting means employing an impeller, gravity or a magnetic field enables solid particles to be directed at a transfer sheet in vacuum.

FIGS. 4 to 7 are conceptual views of an example of an impeller which can be used as a particle accelerator of an ejector. This device corresponds to a centrifugal blasting machine for use in the blasting field.

In the drawings, an impeller 812 has a plurality of blades 813 fixed on both sides to two side surface plates 814, and its rotating central portion is a hollow portion 815 without the blade 813. In the hollow portion 815, a direction controller 816 is housed. The direction controller 816 is in the shape of a hollow tube having an outer periphery partly open in the circumferential direction to form an opening 817. The direction controller 816 has the same axis of rotation as the axis of rotation of the impeller 812, and can rotate independently of the impeller. When the impeller is actually used, the opening of the direction controller is fixed in a suitable direction. Inside this direction controller, another impeller which is hollow inside and which has the same axis of rotation as the axis of rotation of the impeller 812 is present as a spreader 818 (see FIG. 6). The spreader 818 rotates together with the external impeller 812. At the center of rotation of the side surface plate 814, a rotating shaft 819 is fixed. The rotating shaft 819 is rotatably supported by a bearing 820, and drivingly rotated by a rotating power source (not shown) such as an electric motor to rotate the impeller 812. The rotating shaft 819 does not pass between the two side surface plates 814 having the blades 813 therebetween to form a shaft-free space.

To the inside of the spreader 818, solid particles P are fed from a hopper, etc. through the transport pipe. Usually, the solid particles are supplied from above (directly above or obliquely above) the impeller. The solid particles fed into the spreader scatter outward under the action of the impeller of the spreader. The scattering solid particles are released only in the direction allowed by the opening 817 of the direction controller 816, and are then supplied to the space between the blades 813 of the external impeller 812. Then, the solid particles collide with the blade 813, are accelerated by the rotating force of the impeller 812, and ejected from the impeller.

Figure 7A:
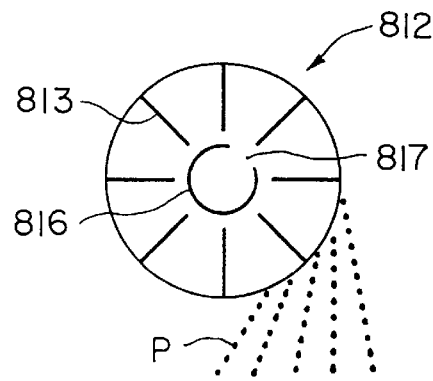
Figure 7B:
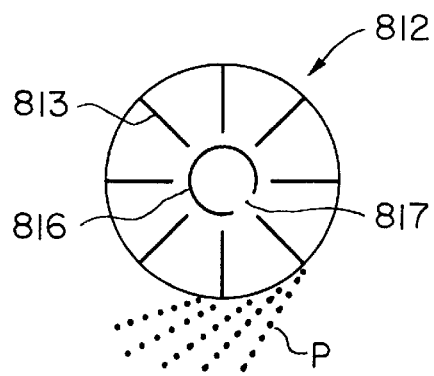

The direction of ejection of the solid particles is nearly vertically downward as shown in FIGS. 4 and 5, but may be horizontal or obliquely downward (not shown). FIGS. 7A and 7B are concept views of ejection direction control for adjusting the direction of ejection of solid particles by setting the direction of the opening 817 of the direction controller 816 (In FIGS. 7A, 7B, the direction controller is fixed in the illustrated positions). The direction controller 816 can adjust the amount of ejection of solid particles by adjusting the sizes in the circumferential and axial directions of the opening.

In FIG. 5, the rotating shaft 819 extends only on the outside of the side surface plate 814 and does not pass up to the hollow portion 815. However, there may be such a constitution that a rotating shaft having a smaller diameter than the diameter of the hollow portion is passed up to the hollow portion, or the interior of a hollow tubular rotating shaft having an opening for passage of solid particles in the outer periphery thereof may itself be a hollow portion (not shown).

The blade 813 is typically in the shape of an oblong flat plate (an rectangular parallelopiped). However, a blade in the shape of a curved plate or a screw such as a screw propeller may be used. The shape of the blade 813 is selected according to its use and purpose. The number of the blades is plural, but usually up to about 10.

The shape of the blade, the number of the blades, the revolution speed of the impeller, the mass, feed rate, and feed direction of solid particles, and the size and direction of the opening of the direction controller are combined to adjust the direction of ejection (blowing), ejection velocity, injection density, and ejection spread angle of the accelerated solid particles.

Figure 8A:
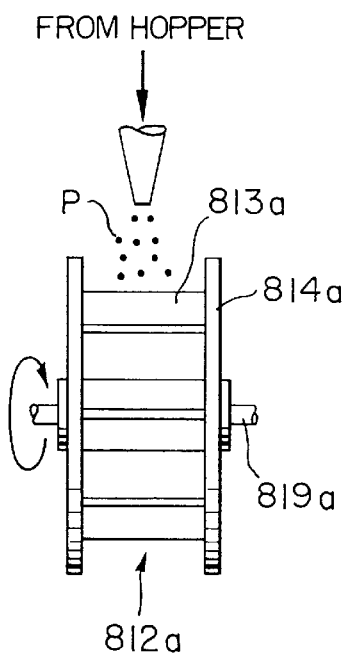
Figure 8B:
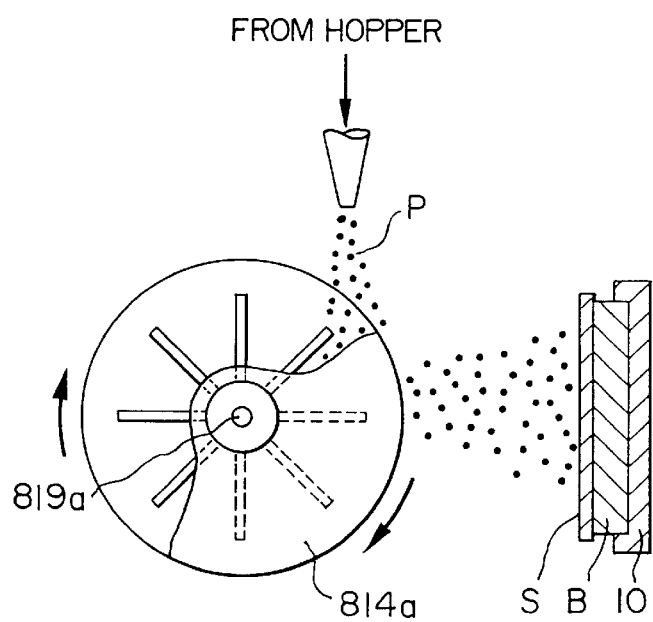

FIGS. 8A and 8B are concept views showing another example of the impeller. An impeller 812a in the drawings has a structure in which a plurality of flat plate-shaped blades 813a are fixed on both sides to two side surface plates 814a. Normally, solid particles P are fed from above (directly above or obliquely above) the impeller. The side surface plates 814a regulate the direction of ejection in the width direction relative to a rotating shaft 819a. The shape of the blade, the number of the blades, the revolution speed of the impeller, and the mass, feed rate and feed direction of the solid particles are combined to adjust the direction of ejection (blowing), ejection velocity, injection density, and ejection spread angle of the accelerated solid particles. The direction of ejection of the solid particles may be vertically downward (not shown), horizontal (FIG. 8), or obliquely downward (not shown). In a side view as FIG. 8B, a transfer sheet S is also illustrated.

The above-described impeller such as 812 or 812a may, if desired, be provided with an ejection guide (not shown) which is open in an ejection withdrawal portion for the solid particles and covers the surroundings of the impeller other than this portion. By so doing, the directions of ejection of the solid particles can be made uniform or controlled. The opening of the ejection guide is, for example, in the shape of a hollow cylinder, a polygonal prism, a cone, a polygonal pyramid, or a fish tail. The ejection guide may be one having a single opening, or one having an inside divided like a honeycomb.

The impeller such as 812 or 812a usually has a diameter of about 5 to 60 cm. The width of the blade is about 5 to 20 cm. The length of the blade is nearly equal to the diameter of the impeller. The revolution speed of the impeller is about 500 to 5,000 rpm. The ejection velocity of the solid particles is about 10 to 50 m/s. The injection density of the solid particles is 10 to 150 kg/m$^2$.

The material for the blade of the impeller may be suitably selected from ceramics, and metals such as steel, high chromium cast steel, titanium or titanium alloys. The solid particles are accelerated upon contact with the blade. Thus, the use of high chromium cast steel or a ceramic with high abrasion resistance is advisable for the blade.

Figure 9:
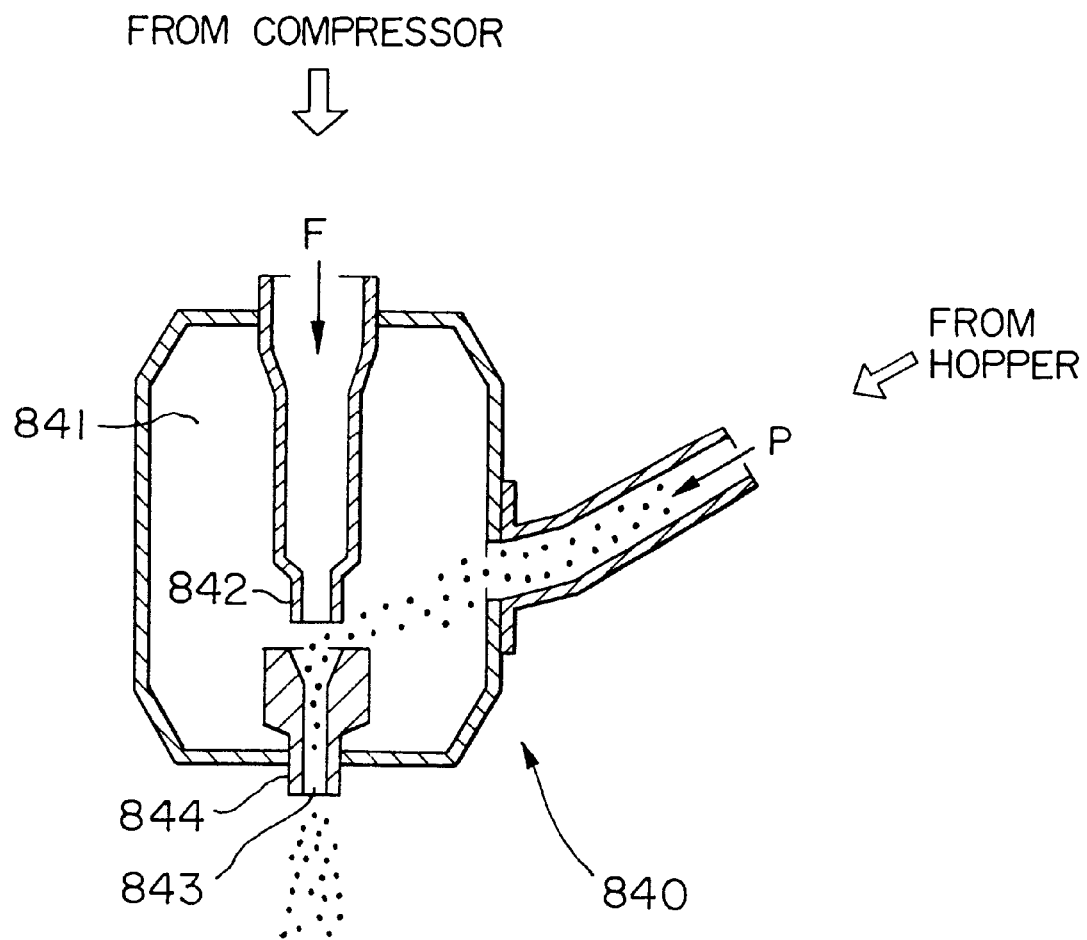

FIG. 9 is a concept view of an example of an ejector 840 using a blowing nozzle as solid particle ejection means for ejecting solid particles together with a fluid. The ejector 840 shown there is an example of an ejector of the type that uses a gas as a solid particle accelerating fluid, and ejects solid particles as a mixture with the gas. This ejector 840 comprises a guide chamber 841 for mixing solid particles P with a fluid F, an internal nozzle 842 for injecting the fluid F into the guide chamber 841, and a blowing nozzle portion 844 for ejecting the solid particles P and the fluid F through a nozzle opening 843. The fluid F is fed from a compressor or fan (not shown) through a suitable pressure tank (not shown), and injected through the internal nozzle 842. Then, the fluid F is passed through the guide chamber 841, and ejected through the nozzle opening 843 of the nozzle 844. In the guide chamber 841 of the ejector, a negative pressure is created by the action of a stream of the fluid flowing at a high velocity. This negative pressure guides the solid particles to the fluid stream to mix the solid particles with the stream. The solid particles are accelerated and carried by the fluid stream, and ejected through the nozzle opening 843 of the nozzle 844 along with the fluid stream.

As the blowing nozzle, a blowing nozzle using a liquid as a solid particle accelerating fluid is also available. In the case of a liquid, the fluid and solid particles are mixed and stored in a pressure tank (not shown) by, for example, a pump (not shown; the fluid is liquid). The mixture is ejected through the nozzle opening of the blowing nozzle.

The nozzle opening is in the shape of a hollow cylinder, a polygonal prism, a cone, a polygonal pyramid, or a fish tail. The blowing nozzle may be one having a single opening, or one having an inside divided like a honeycomb. The fluid pressure is usually about 0.1 to 100 kg/cm$^2$ as a spray pressure. The fluid stream is accelerated usually at a rate of about 1 to 80 m/sec for a liquid stream, or at a rate of about 5 to 80 m/sec for a gas stream.

The material for the ejector, such as the guide chamber or nozzle portion, may be suitably selected from ceramics, steel, titanium and titanium alloys according to the type of the fluid. The solid particles pass along the inner wall of the ejector. Thus, the material for the above parts is preferably ceramic, a material with high abrasion resistance, if rigid particles, such as metal beads or inorganic particles, are used as the solid particles. If the fluid is a liquid, a material free from rusting, melting or corrosion is selected. If the fluid is water, for instance, stainless steel, titanium, titanium alloy, synthetic resin, or ceramic is used. However, steel may be used, if its surface is waterproofed.

The fluid F is used as a solid particle accelerating fluid for accelerating and carrying solid particles by its stream, and ejecting the solid particles together with the fluid from solid particle ejection means (e.g., blowing nozzle). Thus, the fluid F is a solid particle accelerating fluid for accelerating the solid particles. A gas or a liquid may be used as the fluid, but usually, a gas easy to handle is used.

The gas is typically air, but may be carbon dioxide or nitrogen.

The liquid is not restricted, but water is one of the preferred materials because of its incombustibility, ease of drying, nontoxicity, low price, easy of acquisition, etc. Other nonflammable liquids such as fluorocarbon, glycerin or silicone oil may also be used. The liquid (or the gas) can be impinged upon a transfer sheet together with the solid particles. Needless to say, the liquid is higher in density than the gas, so that the liquid can be accelerated more easily than the gas when the solid particles are accelerated by a stream of the fluid.

Concrete examples of a gravure ink prepared using pigments and a binder possessing weather resistance and alkali resistance will be described in further detail by reference to the following Examples.

EXAMPLE 1

The components of each of the formulations (1) to (4) below were kneaded for 24 hours in a ball mill to prepare the gravure ink of the present invention.

(1) Red ink

| | |
|---|---|
| Quinacridone red | 5% by weight |
| Polyazo type red pigment | 5% by weight |
| Vinyl chloride-vinyl acetate copolymer | 20% by weight |
| Epoxy type stabilizer | 1% by weight |
| Toluene (solvent) | 35% by weight |
| Methyl ethyl ketone (solvent) | 34% by weight |

(2) Yellow ink

| | |
|---|---|
| Isoindolinone | 8% by weight |
| Polyazo type yellow pigment | 2% by weight |
| Vehicle (in accordance with red ink) | 90% by weight |

(3) Blue ink

| | |
|---|---|
| Copper phthalocyanine blue | 8% by weight |
| Vehicle (in accordance with red ink) | 92% by weight |

(4) Black ink

| | |
|---|---|
| Carbon black | 10% by weight |
| Vehicle (in accordance with red ink) | 90% by weight |

EXAMPLE 2

The inks (1) to (4) of Example 1 were mixed in equal weights to prepare a gray ink of Example 2.

COMPARATIVE EXAMPLE 1

Control red and yellow inks were prepared using ordinary pigments and the same vehicle as in Example 1.

(5) Red ink

| | |
|---|---|
| Watchung Red (monoazo type pigment) | 5% by weight |
| Vehicle (in accordance with red ink) | |

(6) Yellow ink

| | |
|---|---|
| Benzidine Yellow 5G (monoazo type pigment) | 10% by weight |
| Vehicle (in accordance with red ink) | 90% by weight |

COMPARATIVE EXAMPLE 2

The inks (5) and (6) of Comparative Example 1 and the inks (3) and (4) of Example 1 were mixed in equal weights to prepare a gray ink of Comparative Example 2.

The single-color inks (1) and (2) of Example 1, the gray ink of Example 2, the inks (5) and (6) of Comparative Example 1, and the gray ink of Comparative Example 2 were each printed on a transparent plasticized polyvinyl chloride sheet to use the printed sheets as samples for durability tests.

Each sample was immersed in a 10% aqueous solution of sodium hydroxide for 720 hours at 25° C., and exposed for 1,000 hours under the following conditions, a black panel temperature of 63° C. and a water spray time of 12 minutes in a period of 60 minutes, by means of a carbon arc type sunshine weatherometer. Then, the tested sample was measured by the 5-grade gray scale for discoloration (JIS-L-0804). The degrees of discoloration in the samples of the Examples were all grade 4, showing that the color before the test and the color after the test were almost unchanged. The inks (5) and (6) of Comparative Example 1, on the other hand, showed grade 1 on the gray scale, representing marked fading. The gray ink of Comparative Example 2 changed to bluish black in terms of hue.

As an alternative evaluation method, the above samples were each immersed in a 5% aqueous solution of sodium hydroxide, and exposed to outdoor sunlight for 120 hours at an average daytime atmospheric temperature of 20° C. After exposure, the samples were measured by the gray scale, and discoloration and fading compared with the samples before exposure were evaluated. The samples of the Examples were all at grade 4 to 5, while the samples of the Comparative Examples were all at grade 2 to 3.

None of the samples of the Examples and the Comparative Examples showed peeling of the ink.

EXAMPLE 3

As shown in FIG. 1, wood free paper 1 weighing 52.3 g/m² was melt extrusion coated with 20 μm of polypropylene as a release layer 2 to prepare a base sheet 3.

The release layer 2 was coated with a strippable primer layer 4 consisting essentially of chlorinated rubber/acrylic resin to an amount of 3 g/m². Further, a pattern layer 5 using the durable ink prepared in Example 2 was applied. Thus, a transfer sheet 10 of Example 3 having a pattern transfer layer 6 was constructed.

The surface of a 25 mm thick porous concrete plate 8 shown in FIG. 2 was coated with a two component curable polyurethane type adhesive comprising polyether polyol and hexamethylene diisocyanate. Thus, an adhesive layer 7 was provided to close irregularities and holes on the surface to make a smooth surface. On the adhesive coated surface, the pattern transfer layer 6 side of the transfer sheet prepared in Example 3 was superposed, and pressed with a rubber roller from the base sheet 3 side to adhere the pattern transfer layer 6. The composite was allowed to stand for 3 days in an atmosphere of 40° C. to cure the adhesive. Then, only the base sheet 3 was peeled off to obtain a decorative concrete plate.

The decorative concrete plate was exposed by a sunshine weatherometer under the same conditions as in Example 1. Then, its discoloration or fading was compared with the gray color after transfer. The samples tested were all visually recognized as being at grade 4 on the aforementioned gray scale.

A print material (printed matter) formed from the gravure ink of the present invention comprising pigments and a binder with high weather resistance and high alkali resistance is excellent in durability. Hence, the print material can be used for an external wall or flooring of mortar from which an alkaline substance seeps and which requires weather resistance.

A transfer sheet using this ink produces a sufficient decorative effect with durability when used on a surface of a porous concrete plate of mortar, with an adhesive selected suitably.

We claim:

1. A durable gravure ink comprising:
   (A) a high weather resistant pigment selected from the group consisting of quinacridone, perylene and anthracene series red pigments, isoindolinone series yellow pigments, Prussian blue, fast sky blue, and a black pigment comprising a mixture of said red, yellow and blue pigments;
   (B) a high alkali resistant pigment selected from the group consisting of polyazo red pigments, polyazo yellow pigments, indanthrene blue, and aniline black; and
   (C) a high weather and high alkali resistant binder selected from the group consisting of a vinyl chloride-vinyl acetate copolymer, a cyclized rubber, a polyurethane comprising an acrylic polyol or polyether polyol and a polyisocyanate, nitrocellulose, an epoxy resin, polyvinyl fluoride, polyvinylidene fluoride, and mixtures thereof,
   wherein, (1) if said ink is red, said pigments comprise a mixture of at least one red pigment of (A) and at least one red pigment of (B), (2) if said ink is yellow, said pigments comprise a mixture of at least one yellow pigment of (A) and at least one yellow pigment of (B), (3) if said ink is blue, said pigments comprise a mixture of at least one blue pigment of (A) and at least one blue pigment of (B), and (4) if said ink is black, said pigment comprises a mixture of at least one black pigment of (A) and at least one black pigment of (B).

2. A decorative material comprising:
   a base; and
   a decorative layer provided on said base, the decorative layer being formed from a durable gravure ink comprising:
   (A) a high weather resistant pigment selected from the group consisting of quinacridone, perylene and anthracene series red pigments, isoindolinone series yellow pigments, Prussian blue, fast sky blue, and a black pigment comprising a mixture of said red, yellow and blue pigments;
   (B) a high alkali resistant pigment selected from the group consisting of polyazo red pigments, polyazo yellow pigments, indanthrene blue, and aniline black; and
   (C) a high weather and high alkali resistant binder selected from the group consisting of a vinyl chloride-vinyl acetate copolymer, a cyclized rubber, a polyurethane comprising an acrylic polyol or polyether polyol and a polyisocyanate, nitrocellulose, an epoxy resin, polyvinyl fluoride, polyvinylidene fluoride, and mixtures thereof,
   wherein, (1) if said ink is red, said pigments comprise a mixture of at least one red pigment of (A) and at least one red pigment of (B), (2) if said ink is yellow, said pigments comprise a mixture of at least one yellow pigment of (A) and at least one yellow pigment of (B), (3) if said ink is blue, said pigments comprise a mixture of at least one blue pigment of (A) and at least one blue pigment of (B), and (4) if said ink is black, said pigment comprises a mixture of at least one black pigment of (A) and at least one black pigment of (B).

3. A transfer sheet comprising:
   a base sheet having release properties; and
   a pattern transfer layer provided on a surface of said base sheet, said pattern transfer layer being formed from a durable gravure ink comprising
   (A) a high weather resistant pigment selected from the group consisting of quinacridone, perylene and anthracene series red pigments, isoindolinone series yellow pigments, Prussian blue, fast sky blue, and a black pigment comprising a mixture of said red, yellow and blue pigments;
   (B) a high alkali resistant pigment selected from the group consisting of polyazo red pigments, polyazo yellow pigments, indanthrene blue, and aniline black; and
   (C) a high weather and high alkali resistant binder selected from the group consisting of a vinyl chloride-vinyl acetate copolymer, a cyclized rubber, a polyurethane comprising an acrylic polyol or polyether polyol and a polyisocyanate, nitrocellulose, an epoxy resin, polyvinyl fluoride, polyvinylidene fluoride, and mixtures thereof,
   wherein, (1) if said ink is red, said pigments comprise a mixture of at least one red pigment of (A) and at least one red pigment of (B), (2) if said ink is yellow, said pigments comprise a mixture of at least one yellow pigment of (A) and at least one yellow pigment of (B), (3) if said ink is blue, said pigments comprise a mixture of at least one blue pigment of (A) and at least one blue pigment of (B), and (4) if said ink is black, said pigment comprises a mixture of at least one black pigment of (A) and at least one black pigment of (B).

4. A method for producing a decorative material comprising:
   providing a transfer sheet having a pattern transfer layer located on a surface of a base sheet having release properties, said pattern transfer layer formed from a durable gravure ink comprising a high weather resistant pigment, a high alkali resistant pigment, and a high weather and alkali resistant binder;
   providing a body having a surface;
   laying the pattern transfer layer side of said transfer sheet on the surface of said body through an adhesive layer; and
   impinging solid particles on the base sheet side of said transfer sheet firmly to adhere the pattern transfer layer to the surface of said body which has received the pattern transfer layer under the pressure of the impingement and thereby forming a decorative material having a decorative layer provided on a base, the decorative layer being said pattern transfer layer.

5. The method as claimed in claim 4, wherein the impingement of the solid particles is performed in a chamber.

* * * * *